000
United States Patent [19]

Lorgé et al.

[11] 4,007,242

[45] Feb. 8, 1977

[54] PROCESS FOR THE MANUFACTURE OF ORIENTED HOLLOW PLASTIC ARTICLES

[75] Inventors: Michel Lorgé, Brussels; Roger Houba, Gembloux, both of Belgium

[73] Assignee: Solvay & Cie, Brussels, Belgium

[22] Filed: Jan. 24, 1975

[21] Appl. No.: 543,932

[30] Foreign Application Priority Data

Feb. 14, 1974 France .............................. 74.05461

[52] U.S. Cl. .................................. 264/89; 264/98; 264/296; 425/DIG. 215

[51] Int. Cl.$^2$ ......................................... B29C 17/07

[58] Field of Search .................. 264/89, 90, 92, 94, 264/96, 98, 99, 296; 425/DIG. 215, 326 B, 387 B; 215/1 C

[56] References Cited

UNITED STATES PATENTS

| | | | |
|---|---|---|---|
| 3,278,664 | 10/1966 | Langecker | 264/98 |
| 3,311,950 | 4/1967 | Strauss | 264/98 X |
| 3,740,181 | 6/1973 | Uhlig | 264/98 X |
| 3,754,851 | 8/1973 | Reilly et al. | 264/98 X |
| 3,781,395 | 12/1973 | Uhlig | 264/98 X |
| 3,833,700 | 9/1974 | Adomaitis | 264/99 X |

*Primary Examiner*—Jan H. Silbaugh
*Attorney, Agent, or Firm*—Spencer & Kaye

[57] ABSTRACT

The production of oriented hollow plastic articles having no weakened zone particularly in their bottom is ensured by blow molding of preforms having a base sealed along a straight line of length practically the same as half the perimeter of their cylindrical lateral part and gradually by changing from the cylindrical shape to the rectilinear shape in the region of the base so that the perimeter remains practically constant throughout all cross-sections.

6 Claims, 8 Drawing Figures

PROCESS FOR THE MANUFACTURE OF ORIENTED HOLLOW PLASTIC ARTICLES

BACKGROUND OF THE INVENTION

The present invention relates to a process for the manufacture of oriented hollow plastic articles which possess a practically constant wall thickness in the stretched zones and which, consequently, possess improved mechanical properties which are the same at all points.

Conventional processes have been known for a long time for the manufacture of hollow articles, such as bottles and the like, starting from plastic. These processes generally make use of the technique of blow-molding a preform which can be either a rough shape which has been injection-molded beforehand, or simply a tubular portion of plastic extruded directly into the blow-mold. Taking account of the relatively low rate of production achieved when employing injection presses, it is generally preferred to resort to the second technique which is commonly called extrusion blow-molding.

More recently, it has been found that the temperature of the rough shape at the instant when it is blow-molded into its final shape has a great influence on the mechanical properties of the articles when they have been released from the mold after cooling.

It has been noted, in fact, that no matter what the nature of the plastic employed may be, and in particular no matter what its ability to crystallize may be, a temperature range for the rough shape always exists in which the subsequent blowing process leads to orientation of the macromolecular chains of the plastic and, consequently, to an often spectacular improvement in the mechanical properties of the products thus manufactured.

Numerous procedures leading to oriented final products have consequently been proposed, all of which involve a stage of thermally conditioning the rough shapes before blowing, which consists of bringing these rough shapes to within the desired temperature range by cooling and/or heating.

One technique for the manufacture of oriented hollow articles consists, in a first stage, or pre-blowing a portion of tubular parison extruded into a preform mold in which the preform thus molded is thermally conditioned in order to enable it to become oriented during final blow-molding, and then, in a second stage, of transferring the conditioned preform to a blow-mold where it acquires its final shape.

The amount by which the portion of parison is expanded during the pre-blowing process is relatively small, because it is preferable for the preform thus prepared to be stretched to a large extent during the subsequent blowing process, since only the latter process is carried out under conditions which lead to orientation of the molecules. Likewise, the length of the preform is less than the height of the finished article so that, during the blowing process, the preform is stretched both axially and radially and thus undergoes bidirectional orientation of the same magnitude in both directions.

In general, during the pre-blowing stage, a preform is thus produced, the diameter of which is only very slightly greater than that of the starting portion of tubular parison, since this expansion takes place to the detriment of the subsequent orientation. In practice, the increase in diameter during the pre-blowing process is kept at less than 20%, relative to the diameter of the starting portion of tubular parison.

Furthermore, the preform prepared by pre-blowing usually possesses a sealed and deflashed base. Hitherto, it has been regarded as satisfactory to produce preforms by pre-blowing, in which the shape of the base is reasonably similar to that of the final hollow article desired. However, it has been found that the subsequent blowing and stretching processes lead to oriented hollow articles in which some zones have been considerably thinned down. This is the case, especially, in the zone of the lateral surface near the base. The existence of these weakened zones causes practically all the benefit of the orientation to be lost, and thus has an extremely detrimental effect.

It is thus apparent that, hitherto, it has not been possible, by means of the pre-blowing and thermal conditioning technique, to manufacture oriented hollow articles which possess constant mechanical properties at all points. On the contrary, the oriented hollow articles produced by this technique always possess zones of weakness, especially in the vicinity of the periphery of their base.

SUMMARY OF THE INVENTION

Applicants have now found a process for the manufacture of hollow articles, employing this technique, which leads to products possessing a practically constant wall thickness and, consequently, improved mechanical properties which are the same at all points.

The present invention thus relates to a process for the manufacture of oriented hollow plastic articles wherein a preform is produced by pre-blowing a portion of tubular parison enclosed in a preform mold, the preform is thermally conditioned in order to enable it to be oriented during final blow-molding and is transferred to a final blow-mold where it is shaped by stretching under the effect of an internal excess pressure, in which the base of the preform is sealed along a straight line of length practically the same as half the perimeter of its cylindrical lateral surface, and the change from the cylindrical shape to the straight line shape is gradual so that the perimeter of the preform remains practically constant throughout all the cross-sections.

The preform thus has the shape of a practically cylindrical tube over its entire height. One end is sealed along a straight line and the part near this seal is produced by making the cross-section more and more oval. The perimeter of the preform is kept practically constant throughout all the cross-sections. The height of the preform is substantially the same as the length of the tubular portion used to form it.

In this way, during the shaping process effected by pre-blowing, the portion of tubular parison is stretched radially in the same manner at all its points. Consequently, the wall thickness of the preform is constant. The stretching of the preform during the subsequent blowing process takes place uniformly and consequently leads to oriented hollow articles with improved mechanical characteristics which are the same at all points. In particular, there are no longer any zones of weakness on the lateral surface in the vicinity of the base.

As has been stated, it is advisable that the perimeter of the preform should remain practically constant throughout all the cross-sections. In principle, it is preferable for this perimeter to remain absolutely constant.

However, applicants have found that a deviation of 10% at most can be tolerated in the region of the base without leading to too great a deterioration in the mechanical properties at certain points of the articles produced.

In common practice, the portion of tubular parison is generally produced directly by extrusion followed by cutting-off, but it is quite obvious that it is optionally possible to employ cold pieces of tube which are heated beforehand to a temperature which enables them to be shaped by pre-blowing. This latter variant can even by preferred when the installation for molding oriented hollow articles has to be used directly by a user who does not have at his disposal personnel who are sufficiently qualified to be able to master an extrusion installation. In the latter case, the extrusion installation is replaced by an oven for heating cold tubular plastic portions delivered to the user.

It is possible to take advantage of the operation of pre-blowing the preform in order simultaneously to shape the neck of the hollow article desired. This shaping of the neck can be effected in accordance with any techniques used at the present time.

The amount by which the portion of tubular parison expands during the pre-blowing process must be kept to as low a value as possible since expansion takes place to the detriment of the subsequent orientation. In general, this expansion is restricted to an increase of the order of 20% and preferably 10% in the diameter of the portion of tubular parison. The pre-blowing operation can be effected either by means of a blow-tube which, in this case, can play a part in shaping the neck, or by means of a hollow needle which pierces the parison transversely.

The time taken for the pre-blowing operation is advantageously used profitably in order at least partially to carry out the thermal conditioning of the preform for the purpose of bringing it to the optimum temperature for its orientation. When the starting material is an extruded parison, this conditioning generally consists of controlled cooling. This cooling process can be achieved by providing cooling channels in the walls of the pre-blowing mold and/or by varying the temperature of the blowing fluid.

If desired, it is also possible to cool certain zones of the preform to a greater extent by employing any known means such as locally moving the cooling channels closer to or further away from the wall of the impression, employing metals of different conductivities and the like.

In the case where the thermal conditioning in the pre-blowing mold proves insufficient to bring the preform to the ideal temperature for orientation, it is very obvious that it is permissible to continue this conditioning outside the pre-blowing mold, for example when the preform is being transferred to the blow-mold.

The preform can be transferred to the final blow-mold by any known means. For this purpose, it is possible to take advantage of shifting the pre-blowing pipe or any other mechanical means.

The final blow-mold can be a conventional mold.

In order to produce bidirectionally oriented hollow articles, it is desirable to use preforms of height markedly less than that of the hollow articles desired. The ratio between these heights mainly determines the degree of longitudinal stretching during the final blowing process. This stretching ratio can in some cases be as much as and even exceed 600%. It is however very obvious that it is possible to employ preforms of height substantially the same as that of the hollow articles desired, in the case when it is not desired to induce any great axial orientation. Hence, as a result of this, the degree of longitudinal stretching of the preforms during the final blowing process can vary to a large extent.

The final blowing process can be carried out by means of a tube or by means of a hollow needle, and it can be sudden, stepwise or gradual.

The process according to the invention can be used to manufacture any oriented hollow articles such as, for example, bottles, cans, barrels and the like.

Any plastic whatsoever can be employed, and the temperature at which the preform is thermally conditioned depends on this choice. Thus, for example, when the plastic employed is high density polyethylene, the preform is conditioned at a temperature of the order of 121° C, whilst if the plastic is polyvinyl chloride, the thermal conditioning can be carried out between 90° and 140° C and preferably between 100° and 125° C.

The process according to the invention can be carried out on any type of equipment whatsoever for the manufacture of oriented hollow articles, starting from preforms produced by pre-blowing and thermal conditioning. In effect, it is consequently sufficient to change the preform mold or molds. The latter must be equipped with an impression which is a negative reproduction of the shape of the preform which is satisfactory for the process according to the invention. In other words, the preform molds must be equipped with an impression designed in such a way that one of its ends seals the portion of tubular parison along a straight line of length practically the same as half the perimeter of its cylindrical cross-section, and that its perimeter remains practically constant throughout all the cross-sections. The cavity of the impression of the preform mold, which is practically cylindrical over its entire length, must gradually become more and more oval on the side where the portion of parison is sealed, whilst keeping its perimeter as constant as possible, a variation of more than 10% having an adverse effect.

The base of the preform mold is preferably equipped, on the side where the portion of parison is sealed, with a movable device such as, for example, a movable knife which makes it possible to cut off and remove the flash projecting from the preform mold. Fabrication of this device does not raise any problem, since the cutting-off process to be carried out takes place along a rectilinear trajectory.

BRIEF DESCRIPTION OF THE DRAWING

The process according to the invention is further explained by the attached figures which are given purely by way of illustraton and in which.

DESCRIPTION OF THE PREFERRED EMBODIMENTS

As can be seen in FIGS. 1 to 5, the pre-blown preform is in the form of a tube 1, the general shape of which is cylindrical, and which possesses a neck 2 formed during the pre-blowing operation. According to the invention, the base of the preform is sealed along a straight line 5 of length substantially the same as half the perimeter of its tubular portion. As is shown by the cross-sections given in FIGS. 3 to 5, which correspond to various cross-sections, the change from the cylindrical shape 1 to the rectilinear shape 5 takes place by gradually rendering the circular section oval in such a way that the perimeter of each cross-section remains substantially constant.

Figure 1:
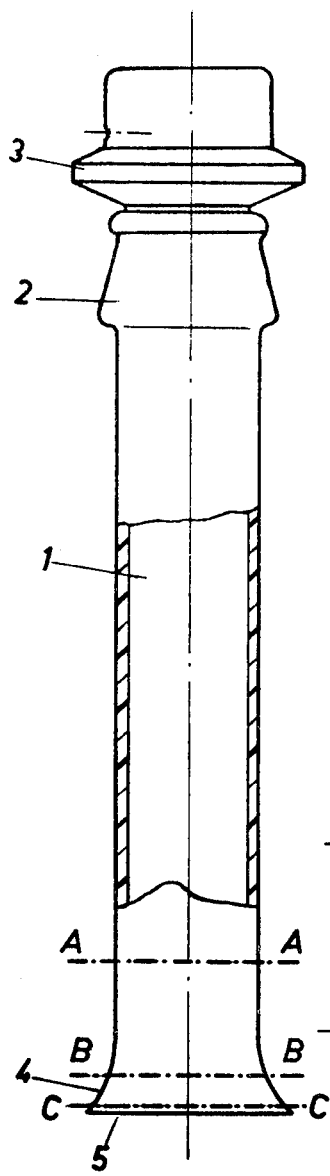
FIG. 1 is a partial cross-sectional view of a preform produced according to the process of the invention.
Figure 2:
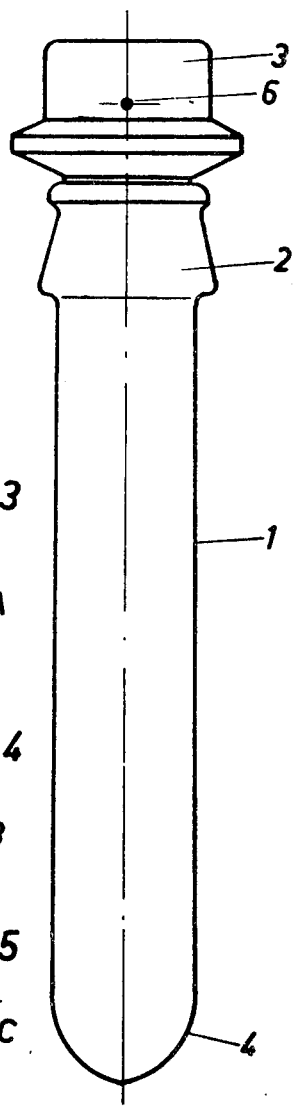
FIG. 2 is a side view of the preform illustrated in FIG. 1, FIGS. 3, 4 and 5 are cross-sections along the planes AA, BB and CC of FIG. 1.
Figure 3:
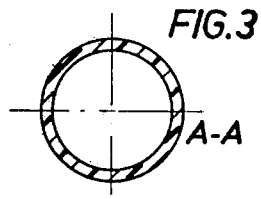
Figure 4:
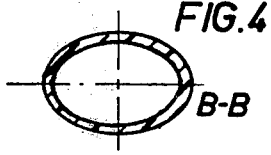
Figure 5:
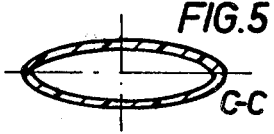
Figure 6:
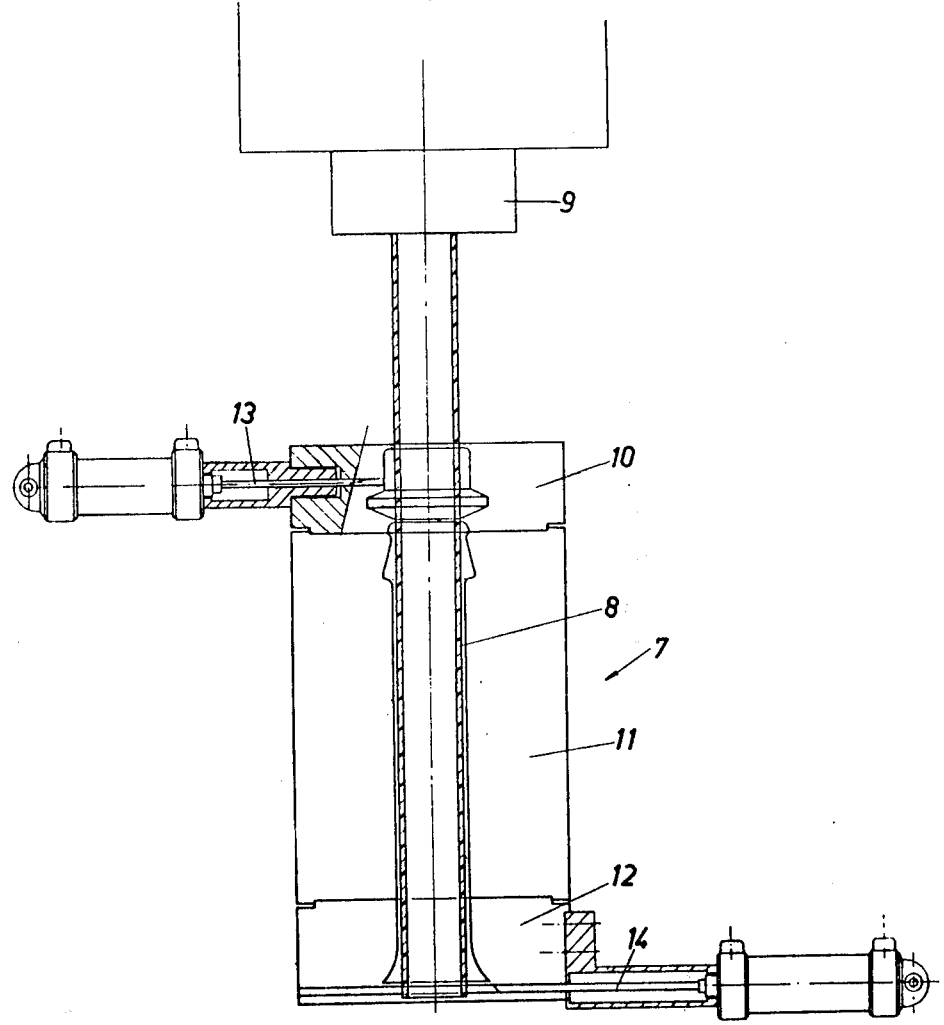
FIG. 6 is a cross-sectional view in elevation of a preform mold at the instant when a portion of tubular parison is introduced.
Figure 7:
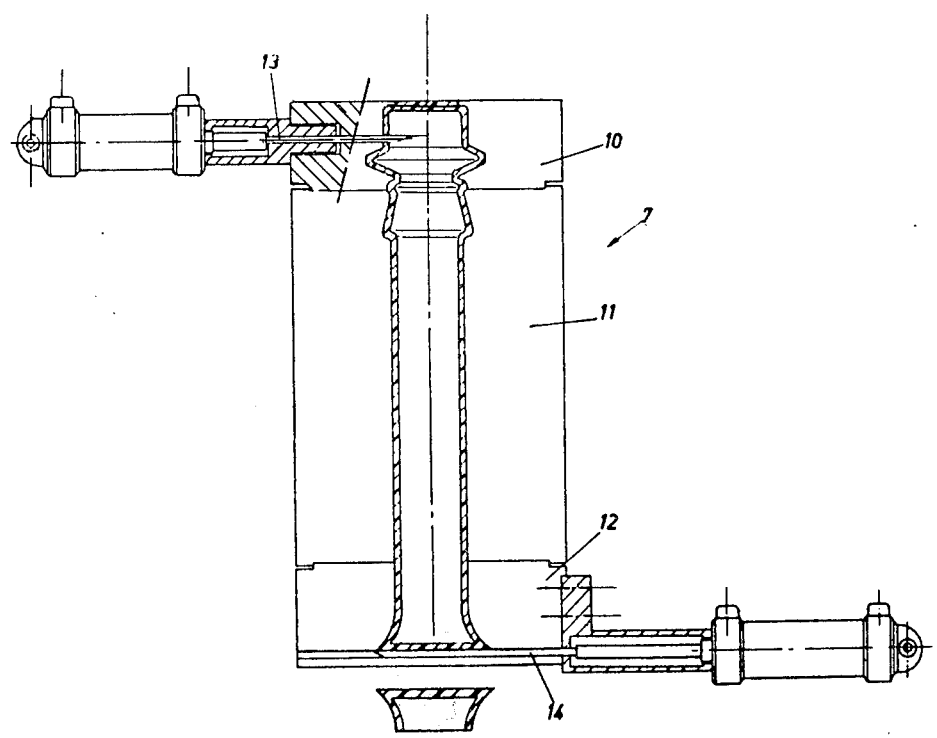
FIG. 7 is a cross-sectional view in elevation of a preform mold after pre-blowing the portion of tubular parison.

As is shown by FIGS. 6 and 7, this preform is produced by pre-blowing, in a preform mold 7, a portion of parison 8 delivered by an extrusion head 9.

The preform mold is made in three parts and comprises a top part 10, a middle part 11 and a bottom part 12, and does so in order to make it possible to produce preformed articles of variable lengths by changing only the middle part which is the easiest to machine. As the figures show, the preblowing operation is carried out by means of a mobile hollow needle 13. For this reason, the preform obtained possesses a false neck 3 comprising the perforation 6 made by the needle. This false neck is removed by cutting its top off before introducing the preform into the final blow-mold. The preform mold also possesses means which are not represented such as cooling channels for thermally conditioning the preform during the pre-blowing process. Finally, the preform mold possesses a movable blade 14 which makes it possible to cut off and remove the flash projecting from the base of the mold during the pre-blowing process.

Figure 8:
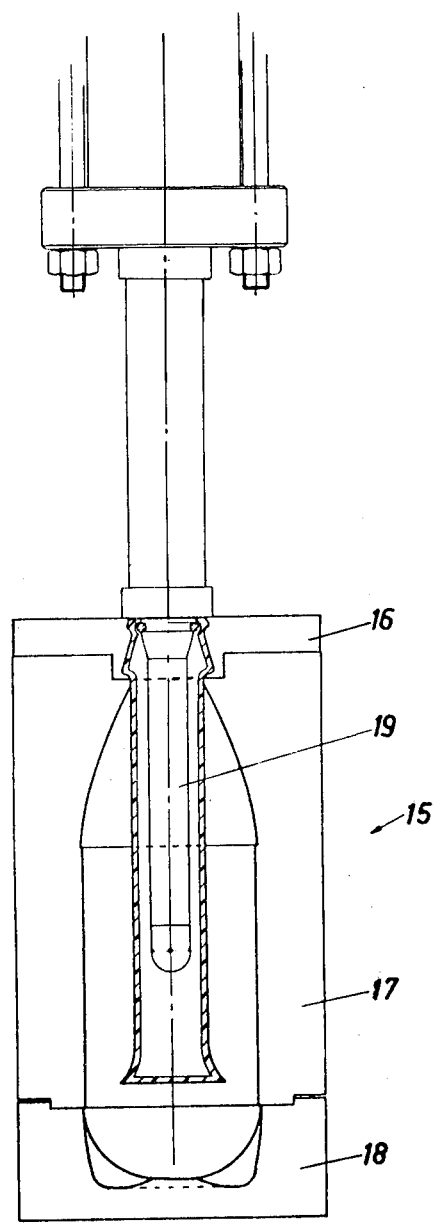
FIG. 8 is a cross-sectional view in elevation of a blow-mold at the instant when the preform is introduced.

FIG. 8 shows a final blow-mold 15 comprising a top part 16, a middle part 17 and a bottom part 18; the purpose of this is to make it possible, by simply replacing the middle part 17, to produce a whole range of hollow articles of different height. This blow-mold is also equipped with a blowpipe 19.

We claim:

1. In a process for manufacturing oriented hollow plastic articles by pre-blowing, in a preform mold, a portion of a cylindrical parison into a preform having a cylindrical shape over one part of its length and a sealed end defining the base of the preform, thermally conditioning the preform to bring it to a temperature at which the plastic will undergo molecular orientation during a subsequent blowing operation, and then placing the conditioned preform in a final blow-mold and effecting such subsequent blowing operation by applying excess pressure internally of the preform to cause it to be shaped by stretching into its final form, the improvement wherein said step of pre-blowing comprises: sealing the end of the parison, in the preform mold, along a straight line to define the base; and applying excess pressure internally of the sealed parison in the preform mold to produce the preform in a manner such that the base is substantially equal in length to one-half the perimeter of the cylindrical part and to create an intermediate length part which is interposed between the cylindrical part and the base and has a cross section which varies progressively from the cylindrical shape of the cylindrical part to the straight-line shape of the base while maintaining a substantially constant perimeter.

2. Process according to claim 1 wherein the perimeter of the preform does not vary by more than 10% throughout all the cross-sections.

3. Process according to claim 1 wherein the increase in the diameter of the portion of tubular parison during the pre-blowing of the preform does not exceed 20%.

4. Process according to claim 1 wherein the thermal conditioning of the preform is at least partially carried out while the latter is being pre-blown.

5. Process according to claim 1 wherein the end of the preform is deflashed while it is being pre-blown.

6. A process as defined in claim 1 wherein the preform mold presents a molding surface shaped to produce such preform intermediate length portion, and the end of the cylindrical parison portion is sealed to form the preform base during closing of the mold.

* * * * *